United States Patent
Lagares Corominas

(10) Patent No.: US 7,182,868 B2
(45) Date of Patent: Feb. 27, 2007

(54) DEVICE FOR FILTERING FLUID SUBSTANCES, USED FOR A MEAT MATERIALS INJECTING MACHINE

(75) Inventor: Narcis Lagares Corominas, Girona (ES)

(73) Assignee: Metalquimia, S.A., Girona (ES)

( * ) Notice: Subject to any disclaimer, the term of this patent is extended or adjusted under 35 U.S.C. 154(b) by 186 days.

(21) Appl. No.: 10/916,624

(22) Filed: Aug. 12, 2004

(65) Prior Publication Data
US 2005/0061731 A1    Mar. 24, 2005

Related U.S. Application Data

(63) Continuation of application No. PCT/ES02/00067, filed on Feb. 12, 2002.

(51) Int. Cl.
B01D 35/16    (2006.01)
A22C 18/00    (2006.01)

(52) U.S. Cl. .................. 210/332; 210/234; 210/328; 210/329; 210/418

(58) Field of Classification Search ............ 210/806, 210/234, 253, 255, 257.1, 259, 297, 323.2, 210/324, 323.1, 329, 332, 335, 124, 171, 210/340, 341, 346, 347, 390, 402, 418; 99/532, 99/533, 535

See application file for complete search history.

(56) References Cited

U.S. PATENT DOCUMENTS

| | | | | |
|---|---|---|---|---|
| 2,326,484 A | * | 8/1943 | Moreton | 210/329 |
| 2,730,241 A | * | 1/1956 | Thomas | 210/437 |
| 4,124,507 A | * | 11/1978 | Mazzetti | 210/141 |
| 4,312,753 A | * | 1/1982 | Bell | 210/250 |
| 4,487,691 A | | 12/1984 | Panora | 210/167 |
| 4,860,805 A | * | 8/1989 | Townsend | 141/382 |
| 5,785,850 A | | 7/1998 | Lynch et al. | 210/304 |
| 2003/0089655 A1 | | 5/2003 | Lagares Corominas | 210/323 |

FOREIGN PATENT DOCUMENTS

WO     WO01/76380     10/2001

* cited by examiner

Primary Examiner—W. L. Walker
Assistant Examiner—Benjamin Kurtz
(74) Attorney, Agent, or Firm—Jacoson Holman PLLC

(57) ABSTRACT

An apparatus for filtering fluid substances is used with a machine for injecting meat products. The device comprises a container (4) comprising filter units (3a, 3b) communicated independently with a suction outlet (6) through respective valve devices (9a, 9b) that can be moved between open and closed positions. Each filter unit (3a, 3b) is mounted to the end of a pivoting connecting conduit (22a, 22b) which is connected to the respective valve device (9a, 9b) thereof. Each conduit (22a, 22b) and filter unit (3a, 3b) can pivot between a lowered operating position, whereby the valve device (9a, 9b) is open and the filter unit (3a, 3b) is submerged in the fluid, and an erect maintenance position, whereby the valve device (9a, 9b) is closed and the filter unit (3a, 3b) and the fixing means (13) thereof emerge out from the fluid and are accessible so that they can be released.

16 Claims, 1 Drawing Sheet

DEVICE FOR FILTERING FLUID SUBSTANCES, USED FOR A MEAT MATERIALS INJECTING MACHINE

This is a continuation of PCT/ES02/00067 filed Feb. 12, 2002 and published in Spanish.

FIELD OF THE INVENTION

This invention relates to a device for filtering fluid substances, used for a meat materials injecting machine, of the type comprising a container for temporarily holding a fluid to be filtered and at least two filter units inside same container, assembled in a pivoting fashion and linked to respective valve devices associated with a suction outlet, so that each filter device can adopt a collapsed, working position, in which the corresponding filter device is substantially submerged in the fluid and the respective valve device is in an open position, and an upright, cleaning and maintenance position, in which the corresponding filter unit is completely emerged from the fluid and the respective valve device is in a closed position.

PRIOR ART

Published international application WO 01/76380, in the name of this applicant, describes a filtering device for fluid substances of this type comprising all the elements specified in the preamble of claim 1. Although this filtering device has proved to be fully efficient in practice, the inventor has noticed that it can be notably improved with respect to assembling and disassembling the filter units when they are in the said upright, cleaning and maintenance position, in order to improve their efficiency in these functions.

In said application WO 01/76380, each filter unit comprises a tubular filtering wall and the means for attaching each filtering unit to its support are arranged at the distal end of each filtering wall, in other words, at the end furthest away from its corresponding valve device, and they comprise a pressing plug that closes the filtering tubular wall at this end, and which is compressed by a spindle driven manually by means of a handle and which is assembled on a removable crossbar linked to some longitudinal support uprights. The other end of the tubular filtering wall, in other words, the end nearest the valve device, lies directly on top of a step arranged around the through opening of a mobile body in the valve device which, depending on its position, opens or closes the fluid passage. However, this construction means that, although the filter unit attachment means are completely emerged when the support is in the upright position, an area of the tubular filtering wall near its end that is connected to the valve device, remains submerged and, when a filtering wall is reinstalled after cleaning, in said proximate area a part of the contaminated fluid remains trapped in the container. Furthermore, the contaminating particles that are in suspension in the fluid can become deposited in the seat of the valve device, thus creating a faulty seal at the end of the filtering wall. Optionally, additional filtering protection walls are found attached to the corresponding valve bodies and supports, which are arranged around the outside of the proximate area of the filters and have an opening at the distal end thereof arranged higher than the height reached by the level of fluid in the container. However, when said filtering protection walls move from the collapsed to the upright position, they retain inside some of the contamination suspended in the fluid.

The object of this invention is to solve the afore-mentioned drawbacks by providing a filtering device of the type described above in which the whole of each filter unit is completely emerged and the means for attachment to their corresponding support are also completely emerged and accessible so they can be released when said support is in the upright, cleaning and maintenance position.

EXPOSITION OF THE INVENTION

This object is achieved, in accordance with this invention, by providing said attachment means for each filter unit at a proximate end thereof, in other words, at the end nearest the corresponding valve device and by providing respective connection pipes between said proximate end of each filter device and its corresponding valve device, so that the distance between the proximate end of each filter unit, where the attachment means are situated, and its corresponding valve device is sufficient so that, in said upright, cleaning and maintenance position, said attachment means and the whole corresponding filter unit are completely emerged above the level of the liquid to be filtered which is held in said container.

Advantageously, said connection pipes are rigid and they are rigidly joined to some pivoting elements that constitute the opening and closing means of the respective valve devices. The filter units are joined by means of said attachment means to the distal ends of the connection pipes. Thus, said connection pipes perform the function of supporting the filter units, distancing them from their valve devices and carrying the fluid filtered by the filter units towards the valve devices, which are connected to an outlet collector. Preferably, said attachment means comprise respective combined screw threads, or combined bayonet-type closing elements, located at the proximate end of each filter unit and at the corresponding distal end of each connection pipe, possibly including an elastic air-tight seal.

This arrangement has the advantage that it avoids contamination of the tubular filtering walls when they are reinstalled following a cleaning and/or maintenance operation and, furthermore, it makes the construction of the device considerably simpler.

In order to increase the total surface area of each filter unit without increasing its height, both when it is in the collapsed, working position and when it is in the upright, cleaning position, in the device according to this invention it has been envisaged that each filter unit comprises at least two of said tubular filtering walls, having a cylindrical shape, mutually arranged in a parallel and adjacent fashion, and joined by the proximate ends thereof to an equal number of adjacent and parallel branches projecting from a ramification of each connection pipe. In this way, a greater submerged filtering surface is achieved without increasing the height of the level of the fluid in the container.

BRIEF DESCRIPTION OF THE DRAWINGS

A detailed description of an embodiment of this invention is provided below, with reference to the drawings, in which.

DETAILED DESCRIPTION OF AN EMBODIMENT

Figure 1:
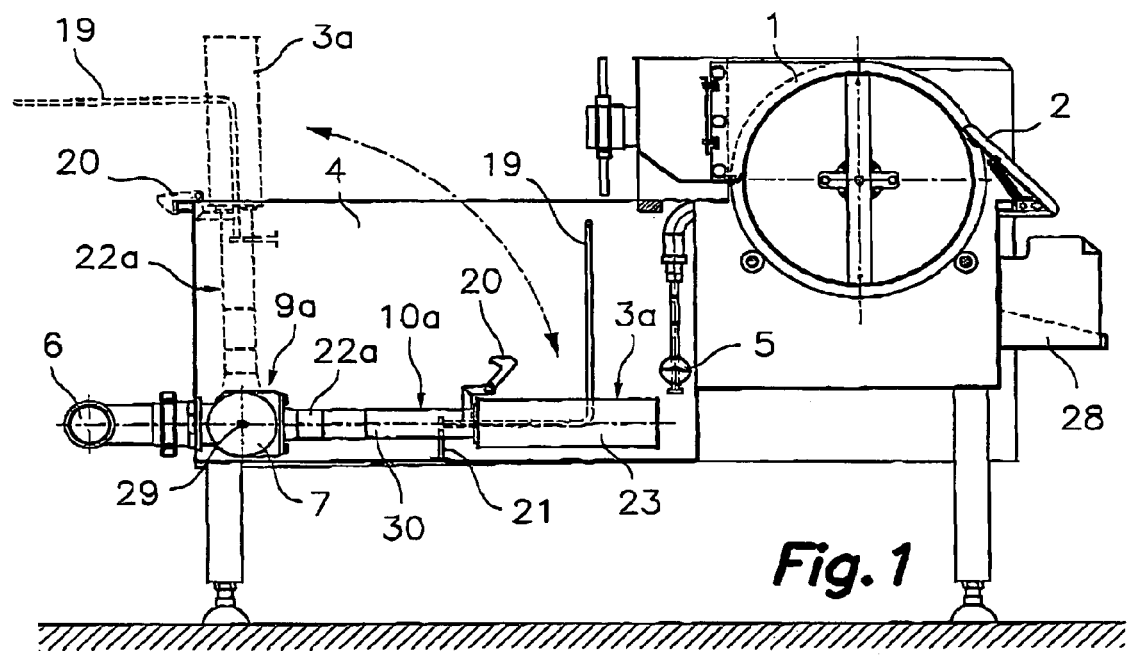
FIG. 1 is a partially sectioned side elevation view, showing the device for filtering fluid substances of this invention, according to an embodiment in which each filter unit comprises two filtering walls.

With reference to the figures, these illustrate an embodiment of the filtering device of this invention, comprising an inlet 27 that takes the fluid to be filtered towards a coarse filter 1, shaped like a rotary drum with a filtering wall, assembled so that it can rotate on a horizontal axis, or another equivalent filtering device. A scraper 2 is tangentially supported on the external surface of the drum and pressed against it by springs in order to withdraw from said surface the largest particles retained by said coarse filter 1 and make them slide towards a collecting tray 28. The prefiltered fluid coming from the coarse filter 1 passes on to a container 4 where it is temporarily retained, the container 4 being provided with collecting means 7 for said fluid towards an outlet 6 connected to some sucking means. An adjustable buoy 5 is provided for keeping a predetermined, constant fluid level in the container 4. Attached to said collecting means 7, there are valve devices 9a, 9b, such as those described in said patent WO 01/076380, which are able to pivot independently with respect to a horizontal axis 29 between open and closed positions. Each of said valve devices 9a, 9b comprises a mobile part provided with a through opening 8 which, depending on its position, determines said open and closed positions of the valve. A corresponding connection pipe 22a, 22b is connected to each of said mobile parts, and in association with the through opening 8 thereof, and at the distal end of each connection pipe 22a, 22b a corresponding filter unit consisting of first and second filter units 3a, 3b, is attached via attachment means 13, said filter units being adapted to retain the smallest sized particles remaining in the fluid after it has passed through said coarse filter 1. In this way, and contrary to the device of cited patent WO 01/076380, said attachment means 13 are arranged at a proximate end of each filter unit 3a, 3b, in other words, at the end nearest the corresponding valve device 9a, 9b, but they are separated therefrom by the connection pipes 22a, 22b.

Therefore, said connection pipes 22a, 22b, which are rigid, act as supports 10a, 10b for the filter units 3a, 3b, they separate them from the valve devices 9a, 9b thereof and they take the fluid filtered by the filter units 3a, 3b towards the valve devices 9a, 9b and, since said supports are mechanically attached to the mobile parts of the respective valve devices 9a, 9b thereof, each support 10a, 10b, in other words, each connection pipe 22a, 22b, can pivot independently between a collapsed, working position (illustrated in solid lines in FIG. 1), in which the corresponding filter unit 3a, 3b is substantially submerged in the fluid to be filtered and in which the corresponding valve device 9a, 9b is in an open position, and an upright, cleaning and maintenance position (shown in dotted lines in FIG. 1), in which said attachment means 13 and the whole of the corresponding filter unit 3a, 3b are emerged and arranged above the level of the liquid to be filtered contained in the container 4. In this way, a filter unit 3a or 3b can be placed in said upright position in order to clean and/or maintain it with complete efficiency, as no part of the filter unit is in contact with the liquid contained in the container 4, while the other filter unit 3a or 3b remains in the collapsed working position, in operation. Thanks to this arrangement, the device can operate continually.

It is important to mention that, in order to achieve a more compact design, each of said connection pipes 22a, 22b is branched in two adjacent and parallel branches 30, and each of said filter units 3a, 3b comprises two tubular, filtering walls 23 (see also FIG. 3), that are perforated or porous, and cylindrically shaped. Each filtering wall 23 is attached, via said attachment means 13, to the far end of each branch 30 of the corresponding connection pipe 22a, 22b. However, this feature is not essential and the device could operate with only one filtering wall, or with more than two, in each filter unit.

The essential feature of this invention is that the distance between the proximate end of each filter unit 3a, 3b, where the attachment means 13 are located, and the corresponding valve device 9a, 9b thereof, in other words, the length of the connection pipes 22a, 22b, is sufficient so that, in said upright, cleaning and maintenance position, said attachment means 13 and the whole of the filtering walls 23 are emerged above the level of the fluid to be filtered contained in container 4.

Figure 3:
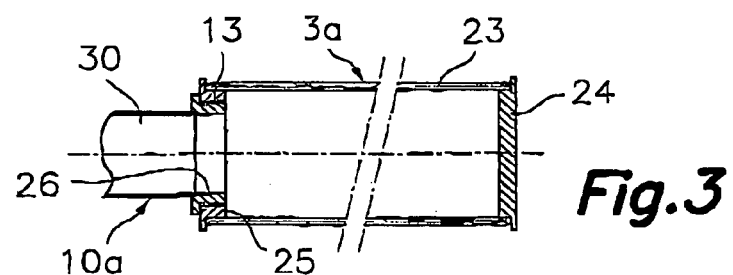
FIG. 3 is a detailed, enlarged cross section illustrating the assembly of one of the tubular filtering walls and the attachment means thereof.

In the illustrated example, and as shown in detail in FIG. 3, the attachment means 13 comprise threaded linking members. Each branch 30 of the connection pipes 22a, 22b is joined by its distal end to a corresponding ring shaped part 26 provided with a corresponding thread, and each filtering wall 23 is joined by its proximate end, in other words, its end nearest the corresponding valve device 9a, 9b to a ring shaped part 25 in which there is incorporated a screw thread combined with the thread in the corresponding ring shaped part 26 in branch 30. The filtering walls 23 are closed at their distal ends by respective fixed covers 24. Said threads, which constitute the attachment means 13, could be replaced by bayonet-type closing elements or any other similar attachment means, with the same efficiency. In some cases, said attachment means 13 can also comprise an elastic airtight seal (not shown).

Figure 2:
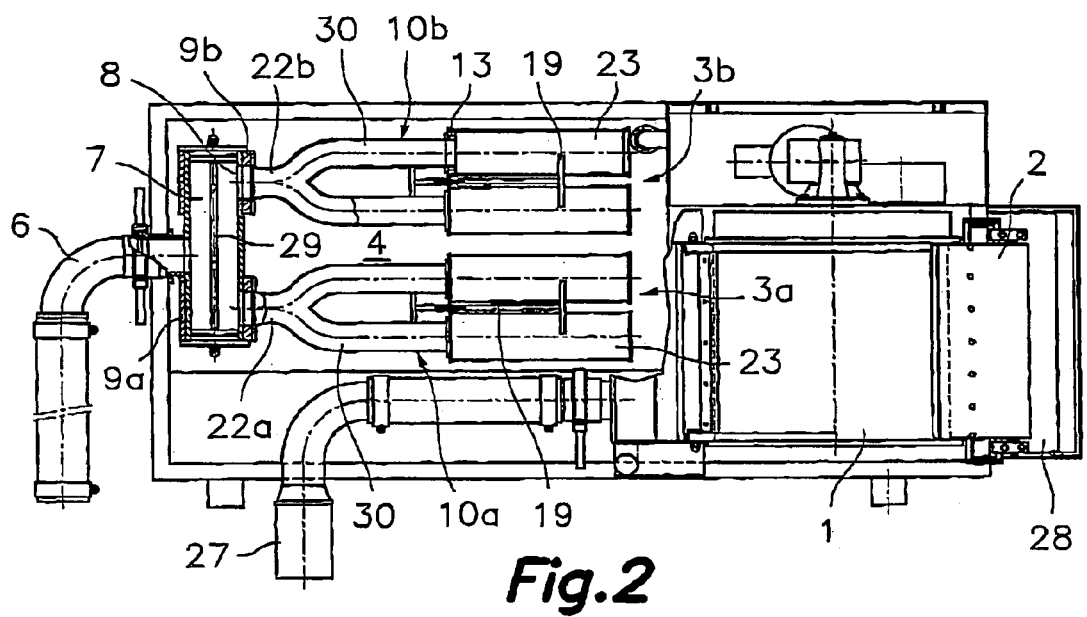
FIG. 2 is a partially sectioned plan view, of the device in FIG. 1.

Returning to FIGS. 1 and 2, each ensemble made up of a filter unit 3a, 3b and its corresponding support 10a, 10b comprises a supporting foot 21, which rests on the bottom of said container 4 when the supports 10a, 10b are in the collapsed, working position, which is substantially horizontal; a handle 19, which remains emerged when the supports 10a, 10b are in said collapsed, working position; and locking means 20 for fastening supports 10a, 10b to the container 4 in the emerged cleaning and maintenance position, which is substantially vertical.

The previous embodiment is merely illustrative and non-limiting of the scope of this invention, which is defined in the attached claims.

The invention claimed is:

1. A device for filtering fluid substances for use in a meat material injecting machine said device comprising:
   a container for temporarily holding a fluid to be filtered, said container having buoy means to maintain a substantially constant fluid level in the container and a sucking outlet connected to suction means, said suction outlet being located at or near a bottom of the container;
   collecting means submerged in the fluid in the container and connected to said sucking outlet;
   first and second valve devices associated with said collecting means and having respective valve elements independently pivotable between open and closed positions;
   first and second supports respectively attached to said valve elements;
   first and second filter units respectively fixed by attachment means to said first and second supports and respectively communicated with inlets of the first and second valve devices;
   each of said supports being able to independently pivot between a laying working position, in which the whole filter unit fixed thereto is submerged in the fluid near the bottom of the container and the corresponding valve device is in an open position, and an upright cleaning and maintenance position, in which at least said attachment means are emerged and accessible to be released and the valve device is in a closed position;

wherein: said attachment means are located at a proximal end of each filter unit, nearer the corresponding valve device;

each filter unit is communicated at said proximal end with the corresponding valve device inlet by means of a respective connection pipe; and the length of each support between the proximal end of the filter unit and the valve device is sufficient to keep, when the corresponding support is in said upright cleaning and maintenance position, the attachment means and the whole of the filter unit above the level of the fluid to be filtered contained in said container.

2. The device according to claim 1, characterised in that said connection pipes are rigid and they have proximal ends rigidly connected to the pivoting valve elements of respective valve devices and distal ends fixed by said attachment means to said proximal ends of the filter units, connection pipes acting as said supports.

3. The device according to claim 2, characterised in that said attachment means comprise respective conjugated screw threads or conjugated bayonet-type closing elements located in said proximal end of each filter unit and in the corresponding distal end of each connection pipe.

4. The device according to claim 3, characterised in that said attachment means also comprises an elastic seal.

5. The device according to claim 3, characterised in that each filter unit comprises at least one cylindrically shaped perforated or porous tubular filtering wall closed at the distal end thereof by a fixed cover and joined at the proximal end thereof to a ring shaped part in which said conjugated screw thread or bayonet-type locking element is provided, and each connection pipe is joined at the distal end thereof to a corresponding ring shaped part in which said conjugated screw thread or bayonet-shaped locking element is provided.

6. The device according to claim 5, characterised in that each ensemble made up of a filter unit and its corresponding support comprises a handle which is emerged when the supports are in the laying working position.

7. The device according to claim 5, characterised in that each ensemble made up of a filter unit and its corresponding support comprises a supporting leg which rests on the bottom of said container when the supports are in the laying working position.

8. The device according to claim 5, characterised in that each ensemble made up of a filter unit and its corresponding support comprises locking means for fastening the supports to the container in the upright cleaning and maintenance position.

9. The device according to claim 5, characterised in that in the laying working position each ensemble made up of a filter unit and its corresponding support is in a substantially horizontal position while in the upright, cleaning and maintenance position each ensemble made up of a filter unit and its corresponding support is in a substantially vertical position.

10. The device according to claim 5, characterised in that it comprises an inlet for the fluid to be filtered, connected to at least one coarse filter unit provided with screening and/or scraper means for withholding and withdrawing the largest sized particles from the fluid to be filtered, and a passageway to pass the prefiltered fluid into said container in which said filter units are located, the filtering walls of the filter units being adapted to retain the smallest sized particles remaining in said fluid after it has passed through said coarse filter unit.

11. The device, according to claim 3, characterised in that each filter unit comprises at least two cylindrically shaped perforated or porous tubular filtering walls parallel and adjacent one another, each one closed at the distal end thereof by a fixed cover and joined at the proximal end thereof to a ring shaped part in which said conjugated screw thread or bayonet-type locking element is provided, and each connection pipe is branched in a like number of adjacent parallel branches, each one joined at the distal end thereof to a corresponding ring shaped part in which said conjugated screw thread or bayonet-shaped locking element is provided.

12. The device according to claim 11, characterised in that each ensemble made up of a filter unit and its corresponding support comprises a handle which is emerged when the supports are in the laying working position.

13. The device according to claim 11, characterised in that each ensemble made up of a filter unit and its corresponding support comprises a supporting leg which rests on the bottom of said container when the supports are in the laying working position.

14. The device according to claim 11, characterised in that each ensemble made up of a filter unit and its corresponding support comprises locking means for fastening the supports to the container in the upright cleaning and maintenance position.

15. The device according to claim 11, characterised in that in the laying working position each ensemble made up of a filter unit and its corresponding support is in a substantially horizontal position while in the upright, cleaning and maintenance position each ensemble made up of a filter unit and its corresponding support is in a substantially vertical position.

16. The device according to claim 11, characterised in that it comprises an inlet for the fluid to be filtered, connected to at least one coarse filter unit provided with screening and/or scraper means for withholding and withdrawing the largest sized particles from the fluid to be filtered, and a passageway to pass the prefiltered fluid into said container in which said filter units are located, the filtering walls of the filter units being adapted to retain the smallest sized particles remaining in said fluid after it has passed through said coarse filter unit.

* * * * *